(12) United States Patent
Todd et al.

(10) Patent No.: US 11,261,699 B2
(45) Date of Patent: *Mar. 1, 2022

(54) HIGH STRENGTH DISSOLVABLE COMPOSITIONS FOR USE IN SUBTERRANEAN WELLS

(71) Applicant: LYONDELLBASELL ADVANCED POLYMERS INC., Houston, TX (US)

(72) Inventors: Bradley L. Todd, Duncan, OK (US); Stanley J. Heath, Duncan, OK (US)

(73) Assignee: LyondellBasell Advanced Polymers Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,175

(22) Filed: Jun. 11, 2019

(65) Prior Publication Data

US 2019/0292878 A1 Sep. 26, 2019

Related U.S. Application Data

(63) Continuation of application No. 15/839,210, filed on Dec. 12, 2017, now abandoned, which is a continuation of application No. 14/919,413, filed on Oct. 21, 2015, now Pat. No. 10,352,127.

(51) Int. Cl.
| | |
|---|---|
| *E21B 33/13* | (2006.01) |
| *C09K 8/516* | (2006.01) |
| *E21B 34/06* | (2006.01) |
| *E21B 33/134* | (2006.01) |
| *E21B 33/138* | (2006.01) |
| *E21B 43/04* | (2006.01) |

(52) U.S. Cl.
CPC ............ *E21B 34/063* (2013.01); *C09K 8/516* (2013.01); *E21B 33/134* (2013.01); *E21B 33/138* (2013.01); *E21B 43/04* (2013.01); *E21B 2200/04* (2020.05); *E21B 2200/05* (2020.05)

(58) Field of Classification Search
None
See application file for complete search history.

(56) References Cited

U.S. PATENT DOCUMENTS

| | | |
|---|---|---|
| 2,551,356 A | 5/1951 | Weiss |
| 3,021,222 A | 2/1962 | Kerr et al. |
| (Continued) | | |

FOREIGN PATENT DOCUMENTS

CN 102123695 A 7/2011

OTHER PUBLICATIONS

Griffith (E. J. Griffith: "The Structure of the Salt Sodium Calcium Metaphosphate" Inorganic Chemistry, p. 962 (1962) 1 page.*

(Continued)

*Primary Examiner* — Charles R Nold

(57) ABSTRACT

A polymetaphosphate composition and method for temporarily sealing a perforation in a wellbore to facilitate a treatment therein and a well tool which can include a flow path, and a flow blocking device which selectively prevents flow through the flow path. The well tool can include a polymetaphosphate composition. A method of constructing a downhole well tool can include forming a structure of a solid mass comprising a polymetaphosphate composition, and incorporating the structure into the well tool.

4 Claims, 6 Drawing Sheets

(56) References Cited

U.S. PATENT DOCUMENTS

| | | | | |
|---|---|---|---|---|
| 3,021,901 A * | 2/1962 | Earlougher | C09K 8/528 | 166/279 |
| 3,179,524 A * | 4/1965 | Hunter | C04B 28/34 | 501/1 |
| 3,551,356 A * | 12/1970 | Bowman | C09C 3/06 | 252/519.53 |
| 4,729,838 A * | 3/1988 | Griffith | C01B 25/45 | 252/1 |
| 7,144,513 B2 | 12/2006 | Sher et al. | | |
| 10,352,127 B2 * | 7/2019 | Todd | E21B 43/04 | |
| 2002/0009622 A1 * | 1/2002 | Goodson | B32B 13/00 | 428/703 |
| 2006/0169454 A1 * | 8/2006 | Savery | C04B 28/30 | 166/280.2 |
| 2010/0168260 A1 | 7/2010 | Frenzel et al. | | |
| 2010/0270016 A1 * | 10/2010 | Carelli | C09K 8/5045 | 166/277 |
| 2010/0319915 A1 * | 12/2010 | Bustos | C09K 8/502 | 166/278 |
| 2012/0000641 A1 * | 1/2012 | Panga | C09K 8/80 | 166/51 |
| 2014/0102704 A1 | 4/2014 | Patil et al. | | |
| 2014/0190686 A1 * | 7/2014 | Cannan | E21B 43/25 | 166/250.01 |
| 2014/0216746 A1 * | 8/2014 | Ballew | C04B 28/18 | 166/294 |
| 2015/0354311 A1 * | 12/2015 | Okura | E21B 33/12 | 175/57 |

OTHER PUBLICATIONS

Cherbib et al. Structure properties relationship in calcium sodium metaphosphate and polyphosphate glasses Journal of Non-Crystalline Solids 485 (2018) 1-13.*

Water Chemicals Codex National Academy Press, Washington DC 1982, 73 pages (Year: 1982).*

Pubfacts Scientific Publication Data: Sodium polymetaphosphate Publications and Abstracts: http://www.pubfacts.com/searchh/sodium+polymetaphosphate; Jul. 28, 2015; 10 pages abstracts only.

Henan Future Chemical Co., Ltd.; Sodium Hexametaphosphate; 2 pages; My Everychina.com; http://henanfuture.sell.china.com/p-09025019-sodium-hexametaphosphate.html; Jul. 28, 2015.

K.M. Suyan, et al; "An Innovative Material For Severe Lost Circulation Control In Depleted Formations", Society of Petroleum Engineers. doi: 10.2118/125693-MS.

USPTO RR dated Aug. 24, 2017 in connection with U.S. Appl. No. 14/919,413.

USPTO NFOA dated Sep. 21, 2017 in connection with U.S. Appl. No. 14/919,413.

Mehrotra, Ram C.. "Synthesis and properties of simple and complex polymetaphosphate glasses of alkali metals." Pure and Applied Chemistry 44 (1975): 201-220.

* cited by examiner

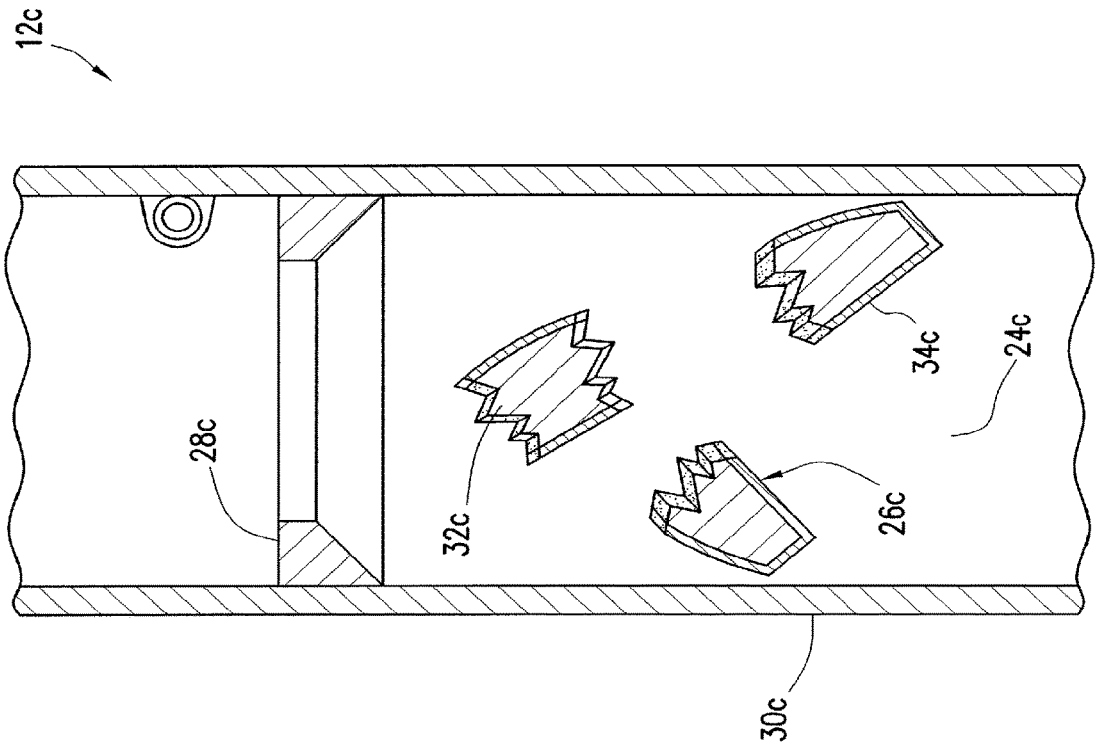
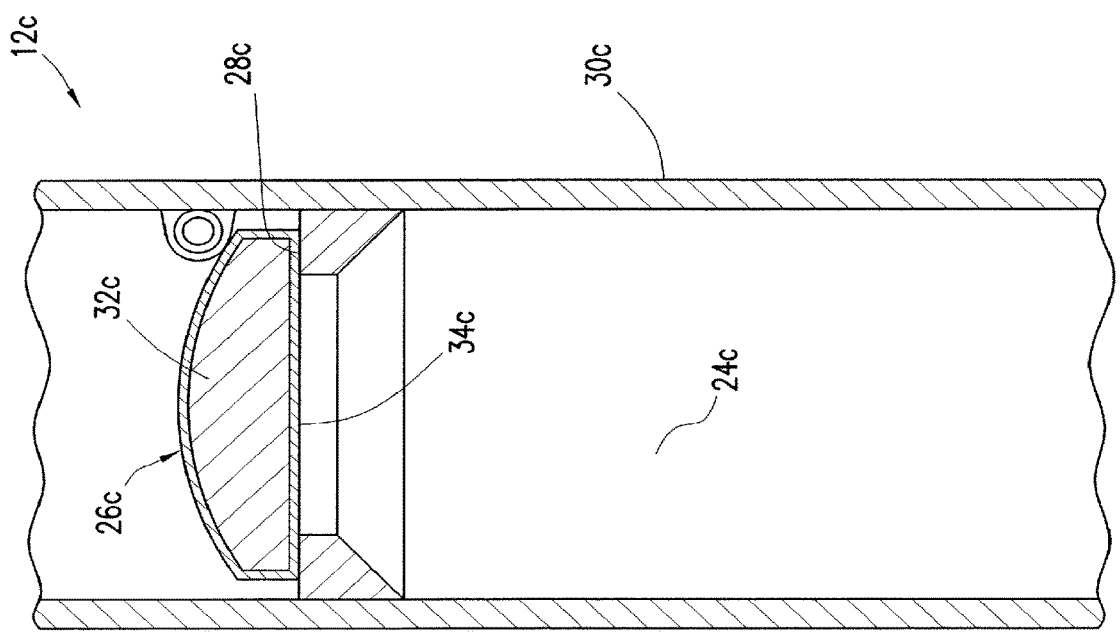

HIGH STRENGTH DISSOLVABLE COMPOSITIONS FOR USE IN SUBTERRANEAN WELLS

This application is a continuation application that claims priority to U.S. non-provisional application U.S. Ser. No. 15/839,210, filed Dec. 12, 2017, claims priority to U.S. non-provisional application U.S. Ser. No. 14/919,413, filed Oct. 21, 2015 and claims priority to U.S. provisional application U.S. Ser. No. 62/070,343, filed Aug. 21, 2014, the entire disclosures of which are incorporated herein by reference.

FIELD OF THE INVENTION

This disclosure relates generally to apparatus utilized and operations performed in conjunction with a subterranean well and, in an embodiment described below, more particularly provides high strength dissolvable compositions for use in a subterranean well.

BACKGROUND OF THE INVENTION

At various times during the life of a well in a subterranean formation it is desirable to treat the well. Such treatments can include perforating, gravel packing, fracturing, and acidizing. These treatments generally involve filling the wellbore with a standing or circulating treatment fluid. Although high fluid permeability is an important characteristic of a hydrocarbon-producing formation, these treatments may be adversely effected by loss of treating fluid into the formations. For example, in an acidizing treatment it is desired to treat the least permeable formation to improve its permeability; however, the formation strata having the highest permeability will most likely consume a major portion of the treatment fluid leaving the least permeable formation strata virtually untreated. During fracturing treatments it is desirable to control loss of the treating fluid to the subterranean formation to maintain sufficient hydraulic pressure to propagate the fracture. During perforating operations, it is desirable to prevent fluids from entering the formation and damaging the formation. During gravel pack operations, it is desirable to recover expensive workover fluids from the wellbore after completion of the operation. The efficient performance of some treatments of the wellbore require temporarily reducing the permeability of formation to reduce the loss of treating fluid during the treatment. To effect control of the treatment fluids in the wellbore it is frequently useful to actuate, or otherwise activate or change a configuration of a flow path in a well. For example, it is beneficial to be able to open or close an opening or flow path in a well bore to be able to permit or prevent fluid flow through the flow path, when desired. The present invention provides compositions, methods and apparatus whereby high strength dissolvable compositions may be used for accomplishing these purposes and others.

SUMMARY OF THE INVENTION

Compositions, well tools and associated methods are provided which bring advancements to the art. One example is described below in which a high strength structure formed of a solid mass comprising a polymetaphosphate composition is used in a well tool. Another example is described below in which the structure comprises a flow blocking device in a well bore.

In one embodiment, this disclosure provides a composition and method for temporarily sealing a perforation in the wellbore to facilitate a treatment such as a fracturing treatment.

In another embodiment, this disclosure provides a unique well tool. The well tool can include a flow path, and a flow blocking device which selectively prevents flow through the flow path. The device includes a polymetaphosphate composition.

In another aspect, a method of constructing a downhole well tool is provided. The method can include: forming a structure of a solid mass comprising a polymetaphosphate composition; and incorporating the structure into the well tool.

These and other features, advantages and benefits will become apparent to one of ordinary skill in the art upon consideration of the detailed description below and the accompanying drawings, in which similar elements are indicated in the various figures using the same reference numbers.

BRIEF DESCRIPTION OF THE DRAWINGS

FIGS. 3A & B are enlarged scale schematic cross-sectional views of another well tool which may be used in the system and method of FIG. 1, the well tool blocking flow through a flow path in FIG. 3A, and permitting flow through the flow path in FIG. 3B.

DETAILED DESCRIPTION OF THE INVENTION

Figure 1:
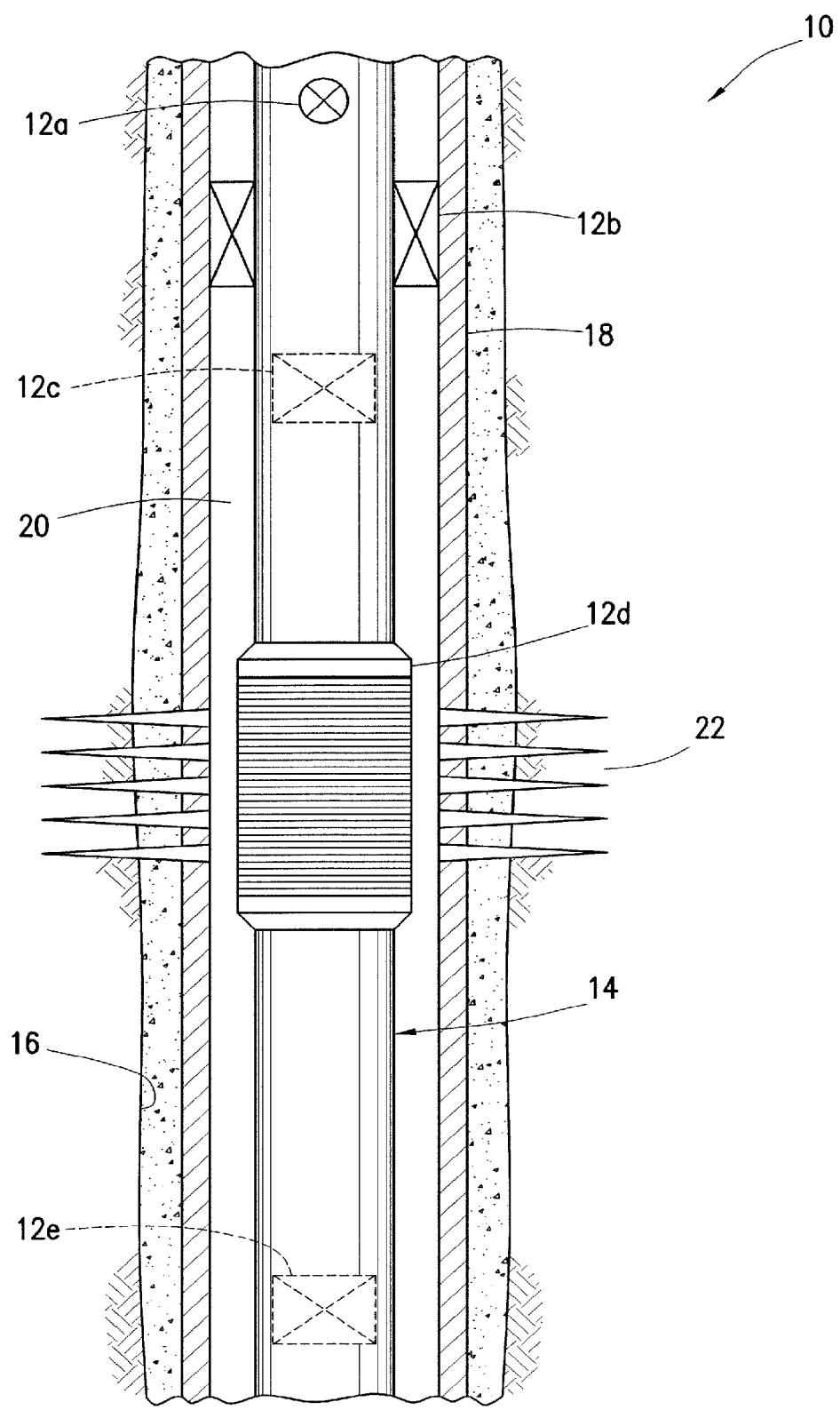
FIG. 1 is a schematic partially cross-sectional view of a well system and associated method embodying principles of the present disclosure.

Representatively illustrated in FIG. 1 is a well system 10 and associated method which embody principles of this disclosure. In the system 10, various well tools 12a-e are interconnected in a tubular string 14 installed in a wellbore 16. A liner or casing 18 lines the wellbore 16 and is perforated to permit fluid to be produced into the wellbore.

At this point, it should be noted that the well system 10 and associated method are merely one example of a wide variety of systems and methods which can incorporate the principles of this disclosure. In one embodiment of the invention a high strength degradable structure is formed of a high strength dissolvable composition in a generally spherical form and a quantity of the structures are introduced into a well bore with a treatment fluid to at least partially seal at least a portion of the perforations existing in well system 10. The high strength structure, which sometimes are refened to as ball sealers, is transported by the fluid and will seat against the perforations in the wellbore communicating with the formation having the highest permeability as a result of fluid flow through the perforation into the formation. The seating of the high strength structure upon the perforation permits subsequent operations to be performed upon the well system 10, such as refracturing treatments upon any perforations which had not previously been successfully stimulated. The treatment fluid may comprise any of the treatment fluids known by those skilled in the art for use with perforation ball sealers. The fluid pressure applied to the high strength structure can cause the structure to become lodged in the perforation and if not removed would adversely effect the subsequent production of fluids from the subterranean formation. Advantageously, the composition of the high strength structure is slowly degradable in any aqueous fluid present in the formation under the conditions existing in the subterranean formation. In another embodiment, the ball sealers may be coated with a second material which may be pliable, such as a polymer, resin or the like such as those hereinafter described below, to enhance the sealing of the high strength structure against the perforation. The coating should either dissolve upon sufficient exposure to fluids present in the subterranean formation or be sufficiently permeable to permit aqueous formation fluids to contact the dissolvable composition within the high strength structure beneath the coating to degrade the structure.

In other examples, the wellbore 18 may not be cased, or if cased it may not be perforated. In further examples, the well tools 12*a-e*, or any of them, could be interconnected in the casing 18. In still further examples, other types of well tools may be used, and/or the well tools may not be interconnected in any tubular string. In other examples, fluid may not be produced into the wellbore 18, but may instead be flowed out of, or along, the wellbore. It should be clearly understood, therefore, that the principles of this disclosure are not limited at all by any of the details of the system 10, the method or the well tools 12*a-e* described herein.

The well tool 12*a* is representatively a valve which selectively permits and prevents fluid flow between an interior and an exterior of the tubular string 14. For example, the well tool 12*a* may be of the type known to those skilled in the art as a circulation valve.

The well tool 12*b* is representatively a packer which selectively isolates one portion of an annulus 20 from another portion. The annulus 20 is fanned radially between the tubular string 14 and the casing 18 (or a wall of the well bore 16 if it is uncased).

The well tool 12*c* is representatively a valve which selectively permits and prevents fluid flow through an interior longitudinal flow path of the tubular string 14.

Such a valve may be used to allow pressure to be applied to the tubular string 14 above the valve in order to set the packer (well tool 12*b*), or such a valve may be used to prevent loss of fluids to a formation 22 surrounding the wellbore 16.

The well tool 12*d* is representatively a well screen assembly which filters fluid produced from the formation 22 into the tubular string 14. Such a well screen assembly can include various features including, but not limited to, valves, inflow control devices, water or gas exclusion devices, etc.

The well tool 12*e* is representatively a bridge plug which selectively prevents fluid flow through the interior longitudinal flow path of the tubular string. Such a bridge plug may be used to isolate one zone from another during completion or stimulation operations, etc.

Note that the well tools 12*a-e* are described herein as merely a few examples of different types of well tools which can benefit from the principles of this disclosure. Any other types of well tools (such as testing tools, perforating tools, completion tools, drilling tools, logging tools, treating tools, etc.) may incorporate the principles of this disclosure.

Each of the well tools 12*a-e* may be actuated, or otherwise activated or caused to change configuration, by means of a high strength dissolvable structure thereof.

For example, the circulation valve well tool 12*a* could open or close in response to dissolving of a structure therein. As another example, the packer well tool 12*b* could be set or unset in response to dissolving of a structure therein.

In one unique aspect of the system 10, the high strength dissolvable structure comprises a polymetaphosphate composition of the general formula

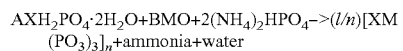
$AXH_2PO_4 \cdot 2H_2O + BMO + 2(NH_4)_2HPO_4 \rightarrow (1/n)[XM(PO_3)_3]_n + ammonia + water$ wherein A and B are numbers of moles of reactants and the ratio of A:B is in the range of from about 1:1 to about 6:1, X is selected from Li, Na or K, M is selected from Be, Mg, Ca, Zn, Pb, Cu or Ni and n is from about 1 to about 100 or greater. Such polymetaphosphate compositions include, but are not limited to, compositions of the formula

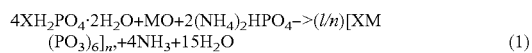
$$4XH_2PO_4 \cdot 2H_2O + MO + 2(NH_4)_2HPO_4 \rightarrow (1/n)[XM(PO_3)_6]_n + 4NH_3 + 15H_2O \quad (1)$$

or

$$2XH_2PO_4 \cdot 2H_2O + MO + 2(NH_4)_2HPO_4 \rightarrow (1/n)[X_2M(PO_3)_4]_n + 4NH_3 + 9H_2O \quad (2)$$

or

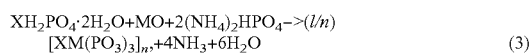
$$XH_2PO_4 \cdot 2H_2O + MO + 2(NH_4)_2HPO_4 \rightarrow (1/n)[XM(PO_3)_3]_n + 4NH_3 + 6H_2O \quad (3)$$

wherein X is Li, Na or K, wherein M is Be, Mg, Ca, Zn, Pb, Cu or Ni and n is from 1 to about 100 or greater. Preferably the polymetaphosphate composition is formed with X comprising Na and M comprising Ca or Mg. Preferably, the polymetaphosphate composition is initially provided as a mixture of granular material. As used herein, the term "granular" includes, but is not limited to, powdered and other fine-grained materials.

As an example, the granular material comprising the polymetaphosphate composition is preferably placed in a graphite crucible or other suitable container, the crucible is placed in a furnace, and the material is heated to approximately 700-900 degrees Celsius or until it fuses. The material is maintained at approximately 700-900 degrees Celsius for about an hour, after which the material is allowed to slowly cool to ambient temperature with the furnace heat turned off.

As a result, the material becomes a solid mass comprising the polymetaphosphate composition. This solid mass may then be readily machined, cut, abraded or otherwise formed as needed to define a final shape of the structure to be incorporated into a well tool.

Alternatively, the heated material may be molded prior to cooling (such as, by placing the material in a mold before or after heating). After cooling, the solid mass may be in its final shape, or further shaping (such as, by machining, cutting abrading, etc.) may be used to achieve the final shape of the structure.

Such a solid mass (and resulting structure) comprising the polymetaphosphate composition will preferably have a compressive strength of greater than about 2000 psi. The polymetaphosphate composition additionally has the desirable property of being dissolvable in an aqueous fluid. For example, a structure formed of a solid mass of a polymetaphosphate composition can be dissolved in water at a temperature of about 93 degrees Celsius in a matter of hours (such as 48 hours or more). Note that a structure formed of a solid mass can have voids therein and still be "solid" (i.e., rigid and retaining a consistent shape and volume, as opposed to a flowable material, such as a liquid, gas, granular or particulate material).

If it is desired to delay the dissolving of the structure, a barrier (such as, a glaze, coating, etc.) can be provided to delay or temporarily prevent hydrating of the structure due to exposure of the structure to aqueous fluid in the well.

One suitable coating which dissolves in aqueous fluid at a different rate than the polymetaphosphate composition is polylactic or polyglycolic acid. A thickness of the coating can be selected to provide a predetermined delay time prior to exposure of the polymetaphosphate composition to the aqueous fluid.

Other suitable degradable barriers include hydrolytically degradable materials, such as hydrolytically degradable monomers, oligomers and polymers, and/or mixtures of these. Other suitable hydrolytically degradable materials include insoluble esters that are not polymerizable. Such esters include formates, acetates, benzoate esters, phthalate esters, and the like. Blends of any of these also may be suitable.

For instance, polymer/polymer blends or monomer/polymer blends may be suitable. Such blends may be useful to affect the intrinsic degradation rate of the hydrolytically degradable material. These suitable hydrolytically degradable materials also may be blended with suitable fillers, if desired.

In choosing the appropriate hydrolytically degradable material, one should consider the degradation products that will result. Also, these degradation products should not adversely affect other operations or components.

The choice of hydrolytically degradable material also can depend, at least in part, on the conditions of the well, e.g., well bore temperature. For instance, lactides may be suitable for use in lower temperature wells, including those within the range of 15 to 65 degrees Celsius, glycolides in intermediate temperatures and polylactides or polyglycolides may be suitable for use in well bore temperatures above this range.

The degradability of a polymer depends at least in part on its backbone structure. The rates at which such polymers degrade are dependent on the type of repetitive unit, composition, sequence, length, molecular geometry, molecular weight, morphology (e.g., crystallinity, size of sphemlites and orientation), hydrophilicity, hydrophobicity, surface area and additives. Also, the environment to which the polymer is subjected may affect how it degrades, that is, temperature, amount of water, oxygen, microorganisms, enzymes, pH and the like.

Some suitable hydrolytically degradable monomers include lactide, lactones, glycolides, anhydrides and lactams.

Some suitable examples of hydrolytically degradable polymers that may be used include, but are not limited to, those described in the publication of Advances in Polymer Science, Vol. 157, entitled "Degradable Aliphatic Polyesters" edited by A. C. Albertsson. Specific examples include homopolymers, random, block, graft, and star- and hyper-branched aliphatic polyesters.

Such suitable polymers may be prepared by polycondensation reactions, ring-opening polymerizations, free radical polymerizations, anionic polymerizations, carbocationic polymerizations, and coordinative ring-opening polymerization for, e.g., lactones, and any other suitable process. Specific examples of suitable polymers include polysaccharides such as dextran or cellulose; chitin; chitosan; proteins; aliphatic polyesters; poly(lactides); poly(glycolides); poly(.epsilon.-caprolactones); poly(hydroxybutyrates); aliphatic polycarhonates; poly(orthocsters); poly(amides); poly(urethanes); poly(hydroxy ester ethers); poly(anhydrides); aliphatic polycarhonates; poly(orthoesters); poly(amino acids); poly(ethylene oxide); and polyphosphazcnes.

Of these suitable polymers, aliphatic polyesters and polyanhydrides may be preferred. Of the suitable aliphatic polyesters, poly(lactide) and poly(glycolide), or copolymers of lactide and glycolide, may be preferred.

The lactide monomer exists generally in three different forms: two stereoisomers L- and D-lactide and racemic D,L-lactide (meso-lactide).

The chirality of lactide units provides a means to adjust, among other things, degradation rates, as well as physical and mechanical properties.

Poly(L-lactide), for instance, is a semi-crystalline polymer with a relatively slow hydrolysis rate. This could be desirable in applications where a slower degradation of the hydrolytically degradable material is desired.

Poly(D,L-lactide) may be a more amorphous polymer with a resultant faster hydrolysis rate. This may be suitable for other applications where a more rapid degradation may be appropriate. The stereoisomers of lactic acid may be used individually or combined. Additionally, they may be copolymerized with, for example, glycolide or other monomers like E-caprolactone, 1,5-dioxcpan-2-one, trimethylene carbonate, or other suitable monomers to obtain polymers with different properties or degradation times. Additionally, the lactic acid stereoisomers can be modified by blending high and low molecular weight poly(lactide) or by blending poly(lactide) with other polyesters.

Plasticizers may be present in the hydrolytically degradable materials, if desired. Suitable plasticizers include, but are not limited to, derivatives of oligomeric lactic acid, polyethylene glycol; polyethylene oxide; oligomeric lactic acid; citrate esters (such as tributyl citrate oligomers, triethyl citrate, acetyltributyl citrate, acetyltriethyl citrate); glucose monoesters; partially fatty acid esters; PEG monolaurate; triacetin; poly(.epsilon.-caprolactone); poly(hydroxybutyrate); glycerin-1-benzoate-2,3-dilaurate; glycerin-2-benzoate-1,3-dilaurate; starch; bis(butyl diethylene glycol)adipate; ethy]phthalylethyl glycolate; glycerine diacetate monocaprylate; diacetyl monoacyl glycerol; polypropylene glycol (and epoxy, derivatives thereof); poly(propylene glycol)dibenzoate, dipropylene glycol dibenzoate; glycerol; ethyl phthalyl ethyl glycolate; poly(ethylene adipate)distearate; di-iso-butyl adipate; and combinations thereof.

The physical properties of hydrolytically degradable polymers depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, among other things, elongational viscosity with tension-stiffening behavior.

The properties of the material utilized can be further tailored by blending, and copolymerizing it with another polymer, or by a change in the macromolecular architecture (e.g., hyper-branched polymers, star-shaped, or dendrimers, etc.). The properties of any such suitable degradable polymers (e.g., hydrophobicity, hydrophilicity, rate of degradation, etc.) can be tailored by introducing select functional groups along the polymer chains.

For example, poly(phenyllactide) will degrade at about 1/5th of the rate of racemic poly(lactide) at a pH of 7.4 at 55 degrees C. One of ordinary skill in the art with the benefit of this disclosure will be able to determine the appropriate functional groups to introduce to the polymer chains to achieve the desired physical properties of the degradable polymers.

Polyanhydrides are another type of particularly suitable degradable polymer. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

An epoxy or other type of barrier which does not dissolve in aqueous fluid may be used to completely prevent exposure of the polymetaphosphate composition to the aqueous fluid until the barrier is breached, broken or otherwise circumvented, whether this is done intentionally (for example, to set a packer when it is appropriately positioned in the well, or to open a circulation valve upon completion of a formation testing operation, etc.) or as a result of an unexpected or inadvertent circumstance (for example, to close a valve in an emergency situation and thereby prevent escape of fluid, etc.).

Figure 2B:
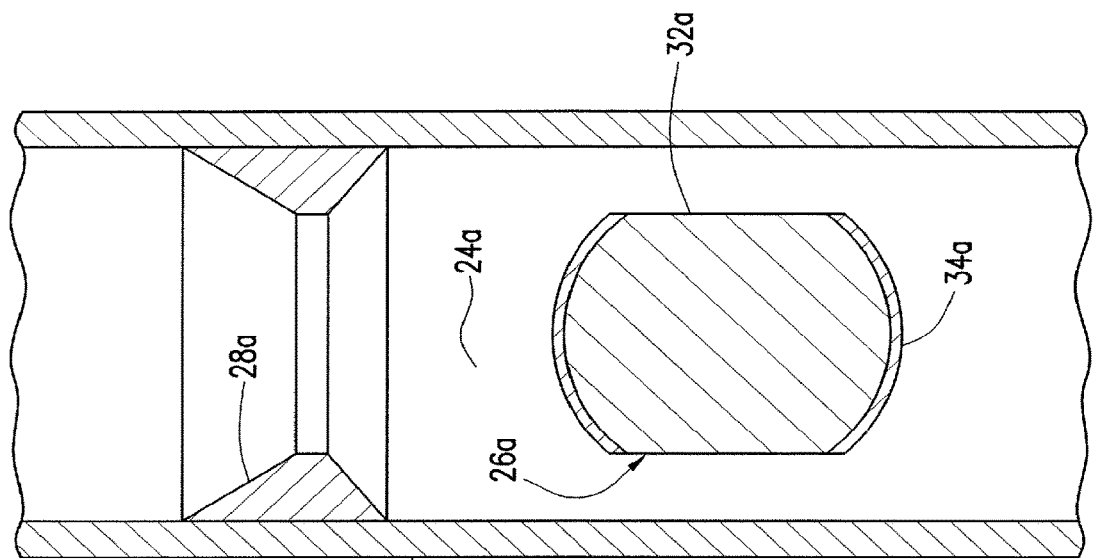
FIGS. 2A & B are enlarged scale schematic cross-sectional views of a well tool which may be used in the system and method of FIG. 1, the well tool blocking flow through a flow path in FIG. 2A, and permitting flow through the flow path in FIG. 2B.
Figure 2A:
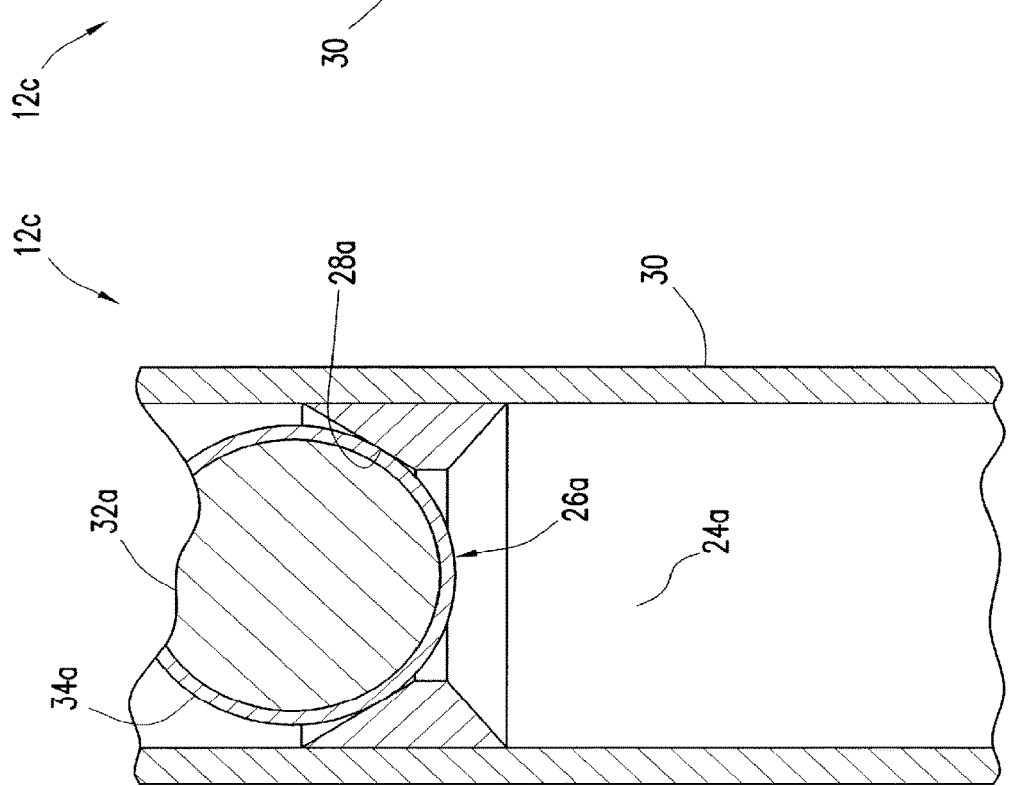

Referring additionally now to FIGS. 2A & B, the well tool 12c is representatively illustrated in respective flow preventing and flow permitting configurations. The well tool 12c may be used in the system 10 and method described above, or the well tool may be used in any other system or method in keeping with the principles of this disclosure.

In the configuration of FIG. 2A, the well tool 12c prevents downward fluid flow, but permits upward fluid flow, through a flow path 24a which may extend longitudinally through the well tool and the tubular string 14 in which the well tool is interconnected. In the configuration of FIG. 2B, the well tool 12c permits fluid flow in both directions through the flow path 24a.

The well tool 12c preferably includes a structure 26a in the form of a ball which sealingly engages a seat 28 in a housing 30. The housing 30 may be provided with suitable threads, etc. for interconnection of the housing in the tubular string 14. The structure 26a may be installed in the well tool 12c before or after the tubular string 14 is installed in the well.

The structure 26a comprises a polymetaphosphate composition 32a with a barrier 34a thereon. The polymetaphosphate composition 32a may be formed of a solid mass as described above. The barrier 34a preferably comprises a coating which prevents exposure of the polymetaphosphate composition 32a to an aqueous fluid in the well, until the barrier is compromised.

With the structure 26a sealingly engaged with the seat 28 as depicted in FIG. 2A, a pressure differential may be applied from above to below the structure. In this manner, pressure may be applied to the tubular string 14, for example, to set a packer, actuate a valve, operate any other well tool, etc. As another example, the sealing engagement of the structure 26a with the seat 28 can prevent loss of fluid from the tubular string 14, etc.

When it is desired to permit downward flow through the flow path 24a, or to provide access through the well tool 12c, a predetermined elevated pressure differential may be applied from above to below the structure 26a, thereby forcing the structure through the seat 28, as depicted in FIG. 2B. This causes the barrier 34a to be compromised, thereby exposing the polymetaphosphate composition 32a to aqueous fluid in the well. As a result, the polymetaphosphate composition 32a will eventually dissolve, thereby avoiding the possibility of the structure 26a obstructing or otherwise impeding future operations.

Note that the barrier 34a could be made of a material, such as a coating, which dissolves at a slower rate than the polymetaphosphate composition 32a, in order to delay exposure of the polyrnetaphosphate composition to the aqueous fluid.

Referring additionally now to FIGS. 3A & B, another construction of the well tool 12c is representatively illustrated. In FIG. 3A, the well tool 12c is depicted in a configuration in which downward flow through the flow path 24c is prevented, but upward flow through the flow path is permitted. In FIG. 3B, the well tool 12c is depicted in a configuration in which both upward and downward flow through the flow path 24c are permitted.

One significant difference between the well tool 12c as depicted in FIGS. 3A & B, and the well tool 12c as depicted in FIGS. 2A & B, is that the structure 26c of FIGS. 3A & B is in the form of a flapper which sealingly engages a seat 28c. The flapper is pivotably mounted in the housing 30c.

Similar to the structure 26a described above, the structure 26c includes a polymetaphosphate composition 32c and a barrier 34c which prevents exposure of the polymetaphosphate composition to aqueous fluid in the well. When it is desired to permit fluid flow in both directions through the flow path 24c, the structure 26c is broken, thereby compromising the barrier 34c and permitting exposure of the polymetaphosphate composition 32c to the aqueous fluid.

Preferably, the structure 26c is frangible, so that it may be conveniently broken, for example, by applying a predetermined pressure differential across the structure, or by striking the structure with another component, etc. Below the predetermined pressure differential, the structure 26c can resist pressure differentials to thereby prevent downward flow through the flow path 24c (for example, to prevent fluid loss to the formation 22, to enable pressure to be applied to the tubular string 14 to set a packer, operate a valve or other well tool, etc.).

After the polymetaphosphate composition 32c is exposed to the aqueous fluid in the well, it eventually dissolves. In this manner, no debris remains to obstruct the flow path 24c.

Note that the barrier 34c could be made of a material, such as a coating, which dissolves at a slower rate than the polymetaphosphate composition 32c, in order to delay exposure of the polymetaphosphate composition to the aqueous fluid.

Figure 4:
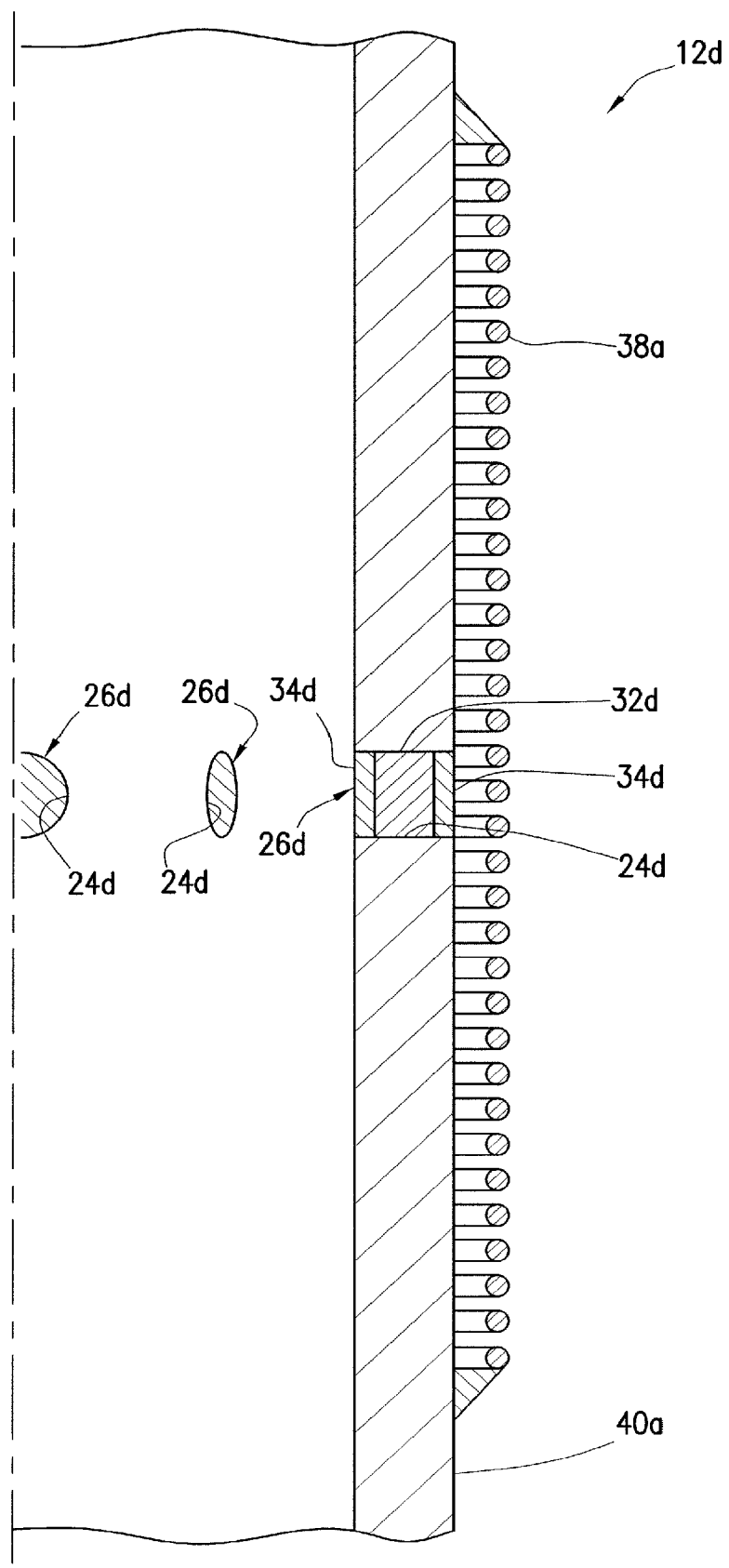
FIG. 4 is a schematic cross-sectional view of another well tool which may be used in the system and method of FIG. 1.

Referring additionally now to FIG. 4, a schematic cross-sectional view of the well tool 12d is representatively illustrated. The well tool 12d comprises a well screen assembly which includes a filter portion 38a overlying a base pipe 40a. The base pipe 40a may be provided with suitable threads, etc. for interconnection in the tubular string 14.

The filter portion 38a excludes sand, fines, debris, etc. from fluid which flows inward through the well screen assembly and into the interior of the base pipe 40a and tubular string 14. However, when the well screen assembly is initially installed in the well, a structure 26d prevents fluid flow between the interior and the exterior of the base pipe 40a.

By preventing fluid flow through the well screen assembly, clogging of the filter portion 38a can be avoided and fluid can be circulated through the tubular string 14 during installation. In this manner, use of a washpipe in the well screen assembly can be eliminated, thereby providing for a more economical completion operation.

After a predetermined period of time (e.g., after installation of the well tool 12d, after a completion operation, after gravel packing, etc.), a barrier 34d dissolves and permits exposure of a polymetaphosphate composition 32d to an aqueous fluid in the well. The polymetaphosphate composition 32d eventually dissolves, thereby permitting fluid flow through a flow path 24d. Thereafter, relatively unimpeded flow of fluid is permitted through the filter portion 38a and the flow path 24d between the exterior and the interior of the well screen assembly.

Note that the structure 26a-d in each of the well tools described above comprises a flow blocking device which at least temporarily blocks flow through a flow path 24a-d. However, it should be clearly understood that it is not necessary for a structure embodying principles of this disclosure to comprise a flow blocking device.

Furthermore, the structure 26a-d in each of the well tool described above can be considered a closure device in a valve of the well tool. Thus, the structure 26a-d in each of the well tools initially prevents flow in at least one direction through a flow path, but can selectively permit flow through the flow path when desired.

It may now be fully appreciated that the above disclosure provides significant improvements to the art of constructing well tools for use in subtenanean wells. In particular, use of the polymetaphosphate composition permits convenient, reliable and economical actuation and operation of well tools.

Those skilled in the art will recognize that the above disclosure provides to the art a method of constructing a downhole well tool 12a-e. The method can include forming a structure 26a-d of a solid mass comprising a polymetaphosphate composition 32a-d; and incorporating the structure 26a-d into the well tool 12a-e.

Forming the structure 26a-d can include at least one of molding, machining, abrading and cutting the solid mass.

The structure 26a-d can comprise a flow blocking device, and the incorporating step can include blocking a flow-path 24a-d in the well tool 12a-e with the structure 26a-d.

The polymetaphosphate composition 32a-d may comprise at least one of compositions previously identified.

The method can include the step of providing a barrier 34a-d which at least temporarily prevents the polymetaphosphate composition 32a-d from hydrating. The barrier 34a-d may comprise a coating, and may comprise polylactic or polyglycolic acid.

The barrier 34a-d may dissolve in an aqueous fluid at a rate slower than a rate at which the polymetaphosphate composition 32a-d dissolves in the aqueous fluid. The barrier 34a-d may be insoluble in an aqueous fluid.

The barrier 34a-d can prevent hydrating of the polymetaphosphate composition 32a-d until after the well tool 12a-e is installed in a wellbore 16. A pressure differential may be applied across the structure 26a-d prior to the barrier 34a-d permitting the polymetaphosphate composition 32a-d to hydrate.

The structure 26a-d may selectively permit fluid communication between an interior and an exterior of a tubular string 14.

The structure 26a-d may selectively block fluid which flows through a filter portion 38a,b of a well screen assembly.

The well tool 12d may comprise a well screen assembly which includes a check valve 42, with the check valve preventing flow outward through the well screen assembly and permitting flow inward through the well screen assembly. Flow inward and outward through the well screen assembly may be permitted when the polymctaphosphate composition 32d dissolves.

The structure 26a-c can selectively block a flow path 24a-c which extends longitudinally through a tubular string 14.

The structure 26a-d may comprise a closure device of a valve. The closure device may comprise a flapper (e.g., structure 26c) or a ball (e.g., structure 26a), and the closure device may be frangible (e.g., structures 26a.c). The polymctaphosphate composition 32a,c can hydrate in response to breakage of the closure device.

The method may include forming the solid mass by heating a granular material comprising the polymetaphosphate composition 32a-d, and then cooling the material. The granular material may comprise a powdered material.

Also provided by the above disclosure is a well tool 12a-e which can include a flow path 24a-d, and a flow blocking device (e.g., structures 26a-d) which selectively prevents flow through the flow path. The device may include a polymetaphosphate composition 32a-d.

The flow blocking device may be positioned adjacent a welded and stress-relieved structure. The polymetaphosphate composition 32a-d may comprise a solid mass formed from a granular material.

In a specific example described above, a method of constructing a downhole well tool 12a-e includes forming a frangible structure 26a-d, the frangible structure comprising a solid mass including an polymetaphosphate composition; and incorporating the frangible structure 26a-d into a valve of the well tool 12a-e.

In other specific examples described above, a well tool 12d includes a flow path 24d which provides fluid communication between an interior and an exterior of a tubular string 14, and a flow blocking device (structure 26d) which selectively prevents flow through the flow path 24d. The flow blocking device includes an polymetaphosphate composition 32d.

Another example described above comprises a well tool 12c which includes a flow path 24c and a flapper (structure 26c) which selectively prevents flow through the flow path. The flapper includes a polymctaphosphate composition 32c.

To facilitate a better understanding of the present invention, and not by way of limitation, the following examples of the dissolution rates of polymetaphosphates of the preferred embodiments of the invention are provided.

Example 1

Approximately 100 gram samples are prepared in accordance with polymetaphosphate composition formula 1 wherein X sodium and M calcium or magnesium, respectively. The samples are each prepared by mixing together sufficient powdered sodium phosphate dehydrate dibasic, ammonium phosphatedibasic and either calcium of magnesium oxide in accordance with formula 1 in amounts sufficient to yield approximately 100 grams of polymetaphosphate. The samples are well blended and poured into a crucible (part number C42, 4.2" top diameter, 6.45 in height, available from Sundance Art Glass, 6052 Foster Rd, Paradise, Calif. 95969). The crucible is left uncovered and placed into a high temperature ceramic kiln. The mixture is heated within the crucible at 260° C. per hour to about 800° C. The individual sample is held at about 800° C. for about one hour after which the furnace is turned off and the sample permitted to cool to room temperature without forced cooling. The sample then is removed from the crucible and broken up into pieces. Pieces of approximately 6 to 8 mesh on the US Sieve Series were retained for testing. The test samples then were placed in water to determine the rate of dissolution.

Figure 5:
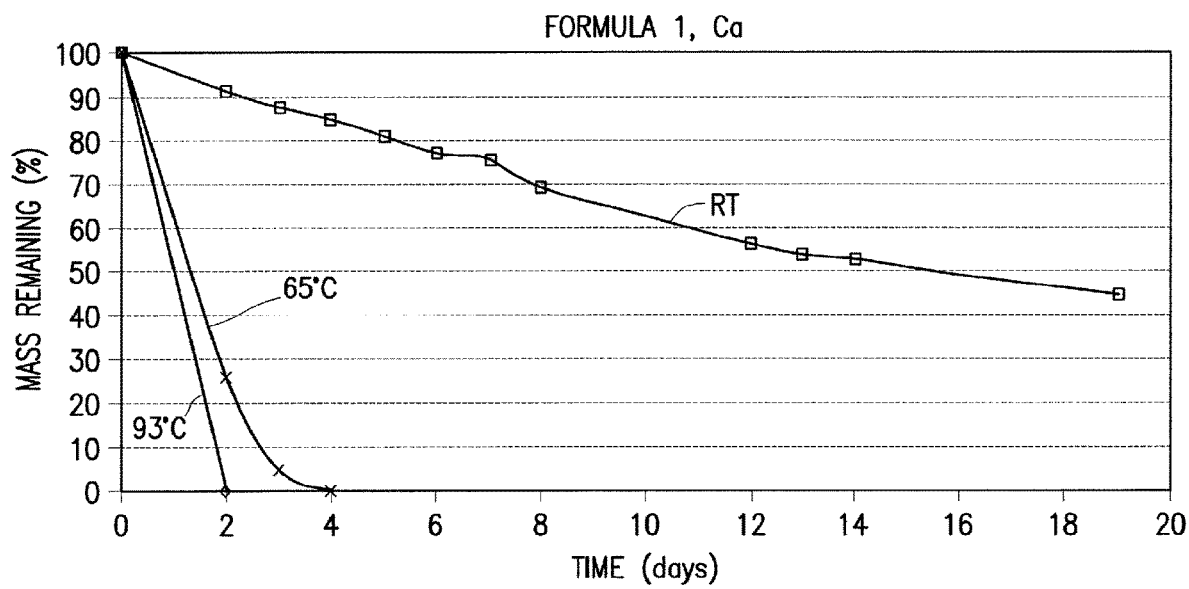
FIG. 5 is a graph of the dissolution of the polymetaphosphate composition of formula 1 wherein M is Ca under various temperature conditions.
Figure 6:
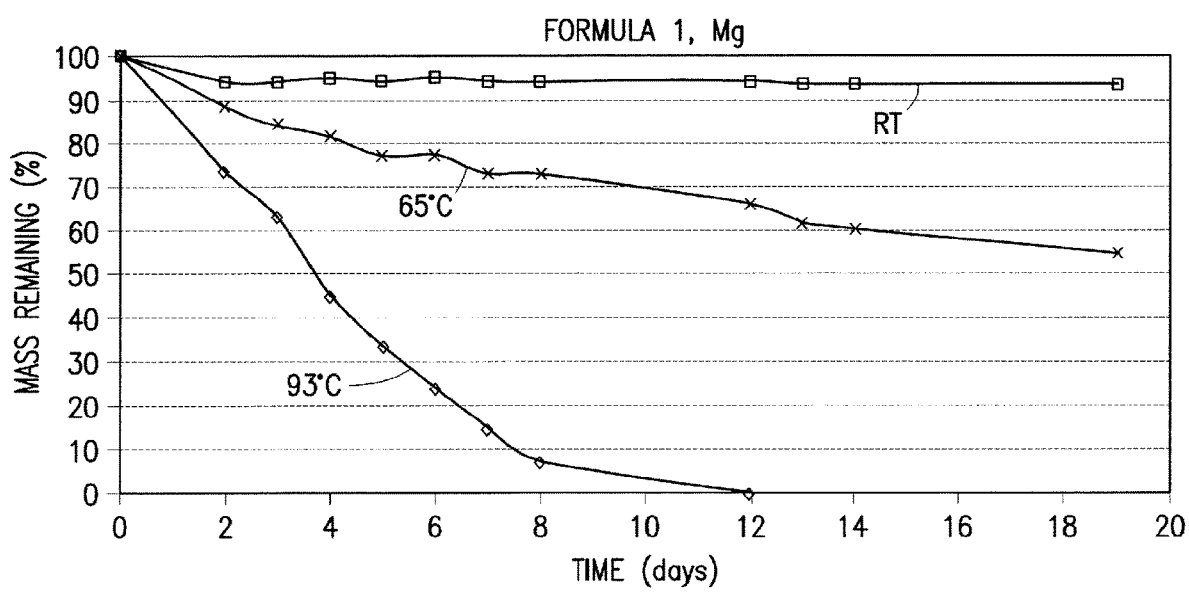
FIG. 6 is a graph of the dissolution of the polymetaphosphate composition of formula 1 wherein M is Mg under various temperature conditions.

The results of the dissolution tests of the individual samples at room temperature (approximately 23 degrees Celsius, about 73° F.), 65 degrees Celsius (about 150° F.) and 93 degrees Celsius (about 200° F.) are shown in FIGS. 5 and 6.

Example 2

Figure 7:
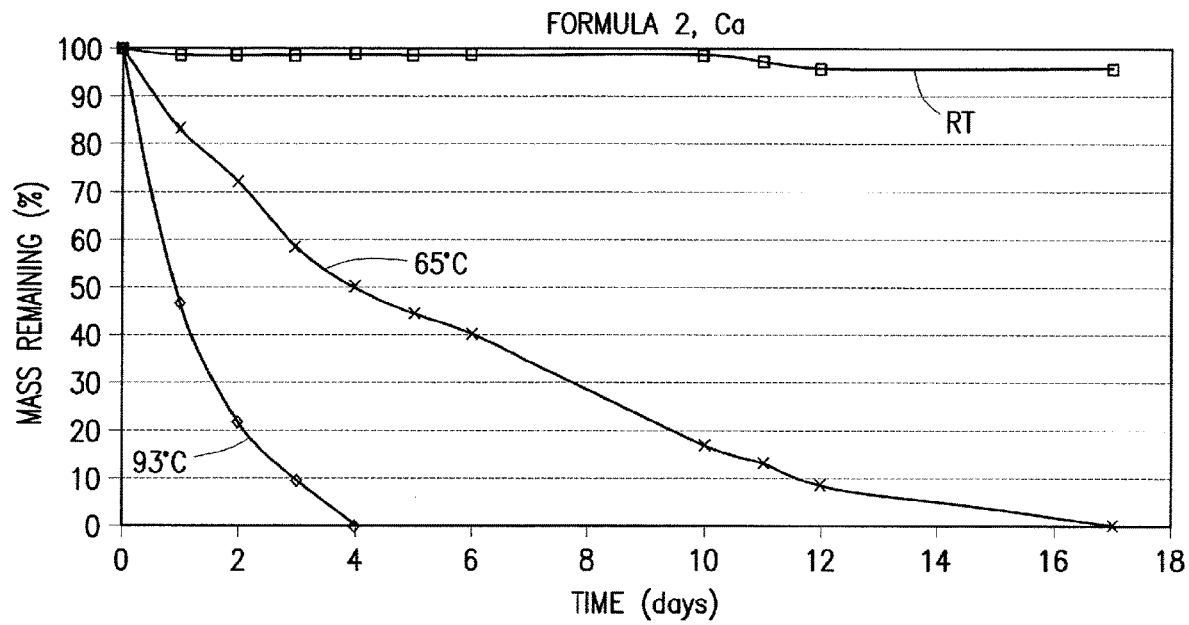
FIG. 7 is a graph of the dissolution of the polymetaphosphate composition of formula 2 wherein M is Ca under various temperature conditions.
Figure 8:
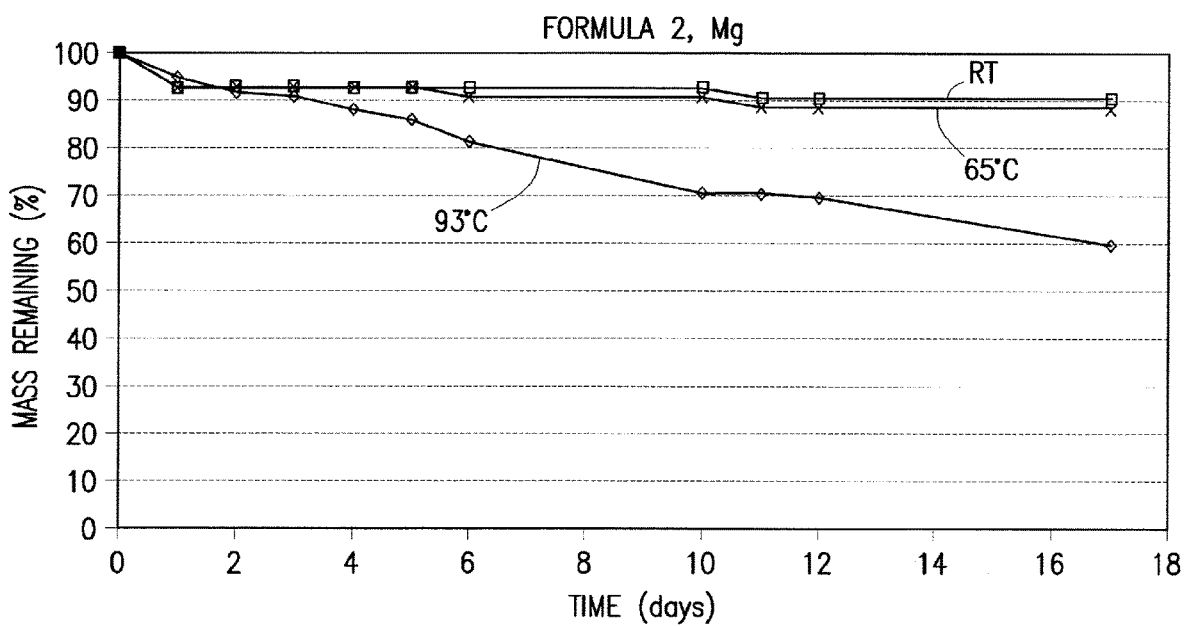
FIG. 8 is a graph of the dissolution of the polymetaphosphate composition of formula 2 wherein M is Mg under various temperature conditions.

Samples are prepared and tested as in Example 1 utilizing the composition formula 2 wherein X is sodium and M calcium and magnesium, respectively. The results of the dissolution tests of the individual samples are shown in FIGS. 7 and 8. Surprisingly, the composition utilizing magnesium exhibits a lower solubility rate in both examples than the composition utilizing calcium.

The following are additional enumerated embodiments of the concepts disclosed herein.

A first embodiment which is a method of plugging the perforations in a casing which has been set in a wellbore which penetrates a subterranean formation comprising: flowing down said casing a well bore fluid having dispersed therein a plurality of substantially spherical high strength degradable compositions being sized to seal said perforations and being comprised of polymetaphosphates of the formula $$AXH_2PO_4 \cdot 2H_2O + BMO + 2(NH_4)_2HPO_4 \rightarrow (1/n)[XM(PO_3)_3]_n + ammonia + water$$

wherein A and B are numbers of moles of reactants and the ratio of A:B is in the range of from about 1:1 to about 6:1, X is selected from Li, Na or K, M is selected from Be, Mg, Ca, Zn, Pb, Cu or Ni and n is from about 1 to about 100 or greater; and continuing the flow of said wellbore fluid until at least a portion of said perforations are sealed by said structures.

A second embodiment which is the method of the first embodiment wherein said high strength structure has a coating of a polymer selected from the group consisting of polylactide, crosslinked polylactide, polyglycolide, crosslinked polyglycolide and mixtures thereof.

A third embodiment which is the method of the first embodiment wherein said high strength structures are substantially spherical with a diameter greater than one-quarter inch.

A fourth embodiment which is the method of any of the first to third embodiments wherein X Na and M is Ca or Mg.

A fifth embodiment which is a method of constructing a downhole well tool, the method comprising: forming a structure or a solid mass being comprised of a polymetaphosphate composition of the general formula:

$$AXH_2PO_4 \cdot 2H_2O + BMO + 2(NH_4)_2HPO_4 \rightarrow (1/n)[XM(PO_3)_3]_n + ammonia + water$$

wherein A and B are numbers of moles of reactants and the ratio of A:B is in the range of from about 1:1 to about 6:1, X is selected from Li, Na or K, M is selected from Be, Mg, Ca, Zn, Pb, Cu or Ni and n is from about 1 to about 100 or greater; forming a housing which supports the structure in the well tool; incorporating the structure into the well tool; and then positioning the housing in a wellbore.

A sixth embodiment which is the method of the fifth embodiment wherein the structure has a barrier coating which at least temporarily prevents the polymetaphosphates from hydrating.

A seventh embodiment which is the method of the fifth embodiment wherein the barrier comprises a polymer selected from the group consisting of polylactide, crosslinked polylactide, polyglycolide, crosslinked polyglycolide and mixtures thereof.

A eighth embodiment which is the method of the fifth embodiment wherein the barrier prevents hydrating of the polymetaphosphates composition until after the well tool is installed in the wellbore.

A ninth embodiment which is the method of the sixth embodiment wherein a pressure differential is applied across the structure prior to the barrier permitting the anhydrous boron compound to hydrate.

A tenth embodiment which is the method of the sixth embodiment wherein the barrier dissolves in an aqueous fluid at a rate slower than a rate at which the polymetaphosphate composition dissolves in the aqueous fluid.

An eleventh embodiment which is the method of any of the fifth to tenth embodiments wherein X is Na and M is Ca or Mg.

A twelfth embodiment which is a method of constructing a downhole well tool, the method comprising: forming a structure of a solid mass comprising a high strength degradable composition comprised of polymetaphosphates of the formula $$AXH_2PO_4 \cdot 2H_2O + BMO + 2(NH_4)_2HPO_4 \rightarrow (1/n)[XM(PO_3)_3]_n + ammonia + water$$

wherein A and B are numbers of moles of reactants and the ratio of A:B is in the range of from about 1:1 to about 6:1, X is selected from Li, Na or K, M is selected from Be, Mg, Ca, Zn, Pb, Cu or Ni and n is from about 1 to about 100 or greater; incorporating the structure into the well tool, wherein the structure comprises a closure device of a valve; and then positioning the well tool in a wellbore.

A thirteenth embodiment which is the method of the twelfth embodiment wherein X is Na and M is Ca or Mg.

A fourteenth embodiment which is the method of the twelfth embodiment wherein the closure device comprises a flapper.

A fifteenth embodiment which is the method of the twelfth embodiment wherein the closure device comprises a ball.

A sixteenth embodiment which is the method of the twelfth embodiment, wherein the closure device is frangible.

A seventeenth embodiment which is a well tool, comprising: a well screen assembly; a flow path; and a flow blocking device which selectively prevents flow through the flow path, the device including a high strength degradable composition comprised of polymetaphosphates of the formula $$AXH_2PO_4 \cdot 2H_2O + BMO + 2(NH_4)_2HPO_4 \rightarrow (1/n)[XM(PO_3)_3]_n + ammonia + water$$

wherein A and B are numbers of moles of reactants and the ratio of A:B is in the range of from about 1:1 to about 6:1, X is selected from Li, Na or K, M is selected from Be, Mg, Ca, Zn, Pb, Cu or Ni and n is from about 1 to about 100 or greater, wherein fluid which flows through the flow path also flows through a filter portion of the well screen assembly, and wherein a barrier at least temporarily prevents the polymetaphosphates composition from hydrating until after the well screen assembly is installed in a wellbore.

An eighteenth embodiment which is a well tool, comprising: a flow path; and a flow blocking device which selectively prevents flow through the flow path, the device including a high strength degradable composition comprised of polymetaphosphates of the formula $$AXH_2PO_4 \cdot 2H_2O + BMO + 2(NH_4)_2HPO_4 \rightarrow (1/n)[XM(PO_3)_3]_n + \text{ammonia} + \text{water}$$

wherein A and B are numbers of moles of reactants and the ratio of A:B is in the range of from about 1:1 to about 6:1, X is selected from Li, Na or K, M is selected from Be, Mg, Ca, Zn, Pb, Cu or Ni and n is from about 1 to about 100 or greater, wherein the well tool comprises a valve, and wherein the flow blocking device comprises a closure device of the valve.

A nineteenth embodiment which is the tool of the eighteenth embodiment wherein the closure device comprises a flapper.

A twentieth embodiment which is the tool of the eighteenth embodiment wherein the closure device comprises a ball.

A twenty first embodiment which is the tool of the eighteenth embodiment wherein the closure device prevents flow in a first direction through the flow path, and the closure device permits flow through the flow path in a second direction opposite to the first direction.

A twenty second embodiment which is the tool of the eighteenth embodiment wherein the closure device is frangible.

It is to be understood that the various examples described above may be utilized in various orientations, such as inclined, inverted, horizontal, vertical, etc., and in various configurations, without departing from the principles of the present disclosure. The embodiments illustrated in the drawings are depicted and described merely as examples of useful applications of the principles of the disclosure, which are not limited to any specific details of these embodiments. In the above description of the representative examples of the disclosure, directional terms, such as "above," "below;" "upper," "lower," etc., are used for convenience in referring to the accompanying drawings. In general, "above," "upper," "upward" and similar terms refer to a direction toward the earth's surface along a wellbore, and "below," "lower," "downward" and similar terms refer to a direction away from the earth's surface along the wellbore.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art, having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range or values, and set forth every range encompassed within the broader range of values. It should be understood that the compositions and methods are described in terms of "comprising," "containing," or "including" various components or steps, the compositions and methods can also "consist essentially of" or "consist of" the various components and steps. Moreover, the indefinite articles "a" or "an", as used in the claims and the description, are defined herein to mean one or more than one of the element that it introduces. Also, the terms in the claims have their plain, ordinary meaning unless otherwise explicitly and clearly defined by the patentee.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A method of plugging perforations in a casing comprising:
   (a) flowing down said casing a wellbore fluid having dispersed therein a composition comprising a polymetaphosphate of the formula $$(1/n)[XM(PO_3)_3]_n$$

wherein X is selected from Li, Na or K, M is selected from Be, Mg, Ca, Zn, Pb, Cu or Ni and n is from about 1 to about 100; and
   (b) continuing the flow of said wellbore fluid until at least a portion of the perforations are sealed by the composition.

2. The method of claim 1 wherein the composition has a coating of a polymer selected from the group consisting of polylactide, crosslinked polylactide, polyglycolide, crosslinked polyglycolide and mixtures thereof.

3. The method of claim 1 wherein the composition is spherical with a diameter greater than one-quarter inch.

4. The method of claim 1 wherein X is Na and M is Ca or Mg.

* * * * *